United States Patent
Song et al.

(10) Patent No.: US 7,272,167 B2
(45) Date of Patent: Sep. 18, 2007

(54) PN CODE CHIP TIME TRACKING WITH SMART ANTENNA

(75) Inventors: Yoo S. Song, Sungnam-Shi (KR); Hyuck M. Kwon, Wichita, KS (US)

(73) Assignee: NeoReach, Inc., Bethesda, MD (US)

( * ) Notice: Subject to any disclaimer, the term of this patent is extended or adjusted under 35 U.S.C. 154(b) by 0 days.

(21) Appl. No.: 11/498,477

(22) Filed: Aug. 3, 2006

(65) Prior Publication Data

US 2006/0268964 A1 Nov. 30, 2006

(51) Int. Cl.
H04K 1/00 (2006.01)
(52) U.S. Cl. ........................ 375/149; 375/150
(58) Field of Classification Search ................ 375/142, 375/143, 145, 150, 152, 148, 149; 714/739
See application file for complete search history.

(56) References Cited

U.S. PATENT DOCUMENTS

| | | | |
|---|---|---|---|
| 5,724,384 A | 3/1998 | Kim et al. | |
| 5,930,243 A | 7/1999 | Parish et al. | |
| 6,201,828 B1 * | 3/2001 | El-Tarhuni et al. | 375/150 |
| 6,229,839 B1 | 5/2001 | Levin et al. | |
| 6,332,008 B1 * | 12/2001 | Giallorenzi et al. | 375/356 |
| 6,353,643 B1 | 3/2002 | Park | |
| 6,369,757 B1 | 4/2002 | Song et al. | |
| 6,370,182 B2 | 4/2002 | Bierly et al. | |
| 6,404,803 B1 | 6/2002 | Wang et al. | |
| 6,434,375 B1 | 8/2002 | Chulajata et al. | |
| 6,462,709 B1 | 10/2002 | Choi | |
| 6,483,459 B1 | 11/2002 | Hou et al. | |
| 6,549,559 B2 * | 4/2003 | Kamgar et al. | 375/134 |
| 6,658,042 B1 | 12/2003 | Tran et al. | |
| 6,782,036 B1 | 8/2004 | Dowling et al. | |
| 6,795,487 B1 | 9/2004 | Bickerstaff et al. | |
| 6,873,667 B2 | 3/2005 | Papasakellariou et al. | |
| 7,154,872 B2 * | 12/2006 | Hsuan | 370/335 |
| 2002/0037028 A1 | 3/2002 | Baltersee et al. | |
| 2002/0193146 A1 | 12/2002 | Wallace et al. | |
| 2003/0142726 A1 | 7/2003 | Eltawil et al. | |
| 2003/0157967 A1 | 8/2003 | Saunders et al. | |

OTHER PUBLICATIONS

Performance analysis of the LMS blind minimum-output-energy CDMA detector, Yu Gong et al; Acoustics, Speech, and Signal Processing, 2000. ICASSP '00. Proceedings. 2000 IEEE International Conference on vol. 5, Jun. 5-9, 2000 pp. 2473-2476 vol. 5.
Sliding window decorrelating algorithm for DS-CDMA receivers Wijayasurlya, S.S.H.; Norton, G.H.; McGeehan, J.P.; Electronics Letters; vol. 28, Issue 17, Aug. 13, 1992 pp. 1596-1598.

(Continued)

Primary Examiner—Temesghen Ghebretinsae
(74) Attorney, Agent, or Firm—Seyfarth Shaw LLP

(57) ABSTRACT

A pseudonoise code teaching loop (PNCTL) measures the difference in energy between a smart antenna array output that is despread using an early pseudonoise code and a late pseudonoise code and contains a chip time shifting current based on this difference. Using multiple elements of the array significantly improves performance.

15 Claims, 8 Drawing Sheets

OTHER PUBLICATIONS

Naguio, A.F., "Adaptive Beamforming for Wireless CDMA", Ph.D. Dissertation Stanford University, Ch. 3, 57-66 (1996).

Song, Y.S., et al., "Computationally Efficient Smart Antennas For CDMA Wireless Communications", IEEE Transactions on Vehicular Technology, 50, 6, 1613-1628 (2001).

Sawahashi, M., et al., "Enhanced Wireless Access Technologies and Experiments for W-CDMA Communications", IEEE Personal Communications, 6-16 (2000).

Viterbi, A.J., "Time Tracking of Pseudorendom Signals", Synchronization of Pseudorendom Signals, 60-66 (1995).

Meyr, H., et al., "The Linearized Timing Error Variance", Baseband Communications, 98-103 (1990).

Song, Y.S., et al., "Smart Antennas for 3G and Future-Generation Code Division Multiple Access Wireless Communications", IEEE, 69-72 (2000).

Chulajata, T., et al., "Adaptive Antenna Array With No Phase Calibration for CDMA Reverse Link", IEEE VTC, 127-134 (2000).

Madyastha, R.K., et al., "Synchronization and Detection of Spread Spectrum Signals in Multipath Channels Using Antenna Arrays", IEEE, 1170-1174 (1995).

Kim, S., et al., "Subspace-based Synchronization Using Antenna Array for DS-CDMA Signals in Multipath Time-Varying Fading Channels", IEEE VTC, 547-551 (2000).

Third Generation Partnership Project, "Common Downlink Physical Channels", 3GPP Technical Specification, 25.211, V3.2.0, 23-27 (2000).

Wang, B. et al., "PN Code Acquisition With Adaptive Antenna Array and Adaptive Threshold for DS-CDMA Wireless Communications", IEEE, 152-156 (2000).

De Gaudenzi, R., et al., "A Digital Chip Timing Recovery Loop for Band-Limited Direct-Sequence Spread-Spectrum Signals", IEEE Transactions on Communications, 41, 11, 1760-1769 (1993).

De Gaudenzi, R., et al., "Decision-Directed Coherent Delay-Lock Tracking Loop for DS-Spread-Spectrum Signals", IEEE Transactions on Communications, 39, 5, 758-765 (1991).

De Gaudenzi, R., "Direct-Sequence Spread-Spectrum Chip Tracking in the Presence of Unresolvable Multipath Components", IEEE Transactions on Vehicular Technology, 48, 5, 1573-1583 (1999).

PN code acquisition using smart antenna for DS-CDMA wireless communications Wang, B.; Kwon, H.M.; MILCOM 2800. 21st Century Military Communications Conference Proceedings vol. 2, Oct. 22-25, 2000 pp. 821-825 vol. 2.

Design and analysis of a smart antenna system for IMT-2000 W-CDMA Eung Soon Shin; Youn Ok Park, Vehicular Technology Conference, 1999 IEEE 49th vol. 3, May 16-20, 1999 pp. 2109-2112 vol. 3.

Performance of wireless, CDMA with M-ary orthogonal modulation and cell site antenna arrays Nagulb, A.F.; Paulraj, A.; Selected Areas in Communications, IEEE Journal on vol. 14, Issue 9, Dec. 1996 pp. 1770-1783.

Space the diversity multistage parallel interference cancellation (MPIC) for CDMA, Ning Kong, Vehicular Technology Conference, 2000. IEEE VTS-Fall VTC 2009. 52nd vol. 6, Sep. 24-26, 2000 pp. 2826-2833 vol. 6.

Weinberg, A., et al., "Discrete Time Analyses of Nonuniform Sampling First- and Second-Order Digital Phase Lock Loops", IEEE Transactions on Communications, Com-22, 2, 123-137 (1974).

Haykin, S., "Stability of the Normalized LMS Filter", 6,324 (1996).

* cited by examiner

PN CODE CHIP TIME TRACKING WITH SMART ANTENNA

BACKGROUND OF THE INVENTION

Field of the Invention

The present invention relates to spread spectrum communications generally, and more particularly to a method and apparatus for maintaining pseudo-noise code synchronization.

Smart antennas, consisting of multiple antenna elements and an adaptive algorithm, have received much attention recently because a smart antenna can suppress interfering signals if the direction of arrival angle (DOA) from the desired signal is different from that of interference, (Ayman F. Naguib, "Adaptive Antennas for CDMA Wireless Networks," Ph.D. Dissertation Stanford University, August 1996 and Y. S. Song, H. M. Kwon, and B. J. Min, "Computationally Efficient Smart Antennas for CDMA Wireless Comm.", IEEE Trans. on Vehicular Technology, Vol. 50, No. 6, November 2001.) Some encouraging field experiment results for smart antennas have been reported (M. Sawahashi, et al., "Enhanced Wireless Access Technologies and Experiments for W-CDMA Communications", IEEE Personal Comm., pp. 6-16, December 2000). In a code division multiple access (CDMA) system, pseudonoise (PN) code synchronization is a difficult and critical process before data demodulation. The locally generated PN code should be synchronized with the received PN code for correct data demodulation. In general, PN code synchronization consists of two steps: PN code acquisition and PN code tracking. PN code acquisition is a coarse PN code synchronization to within a chip interval, and PN code tracking is a fine PN code synchronization (Andrew J. Viterbi, "CDMA Principle of Spread Spectrum Communication", Addison Wesley, N.Y., 1995 and H. Meyr and G. Ascheid, "Synch. in Digital Communications", John Wiley and Sons, 1990.)

Most smart antenna studies have focused mainly on improving the bit error rate (BER) and capacity of a CDMA wireless communications system. Also, most of the time, perfect PN code synchronization has been assumed, or only one of the multiple antenna elements has been employed for PN code synchronization (Ayman F. Naguib, "Adaptive Antennas for CDMA Wireless Networks", Ph.D. Dissertation Stanford University, August 1996; Y. S. Song, H. M. Kwon, and B. J. Min, "Computationally Efficient Smart Antennas for CDMA Wireless Comm.", IEEE Trans. on Vehicular Technology, Vol. 50, No. 6, November 2001; Yoo S. Song, Hyuck M Kwon, and Byung J. Min, "Smart Antennas for 3G and Future Generation CDMA", IEEE International Conference on Phased Array Systems and Technology, Dana Point, Calif., pp. 69-72, May 21-25, 2000) and M. Sawahashi, et al., "Enhanced Wireless Access Technologies and Experiments for W-CDMA Communications", IEEE Personal Comm., pp. 6-16, December 2000.) This may be due to existing conventional antenna diversity schemes where antenna element spacing is large, e.g., ten times a wavelength, and arrived signals at different antenna elements are independently faded. This independent fading may make it difficult to coordinate the elements for the purpose of PN code synchronization. However, antenna element spacing in a smart antenna design for a CDMA system is usually assumed to be a half wavelength or less, and received signals at different antenna elements are the same except for phase differences due to the small spatial separation when the element response is identical. Calibration may be required, depending on the smart antenna algorithms, if the element response is not identical. If a normalized least mean square (NLMS) algorithm is used, then phase calibration is not necessary even though radio frequency (RF) mixers for each element have different phase responses (T. Chulajata, H. M. Kwon, and K. Y. Min, "Adaptive Antenna Array with No Phase Calibration for CDMA Reverse Link", IEEE VTC'2000 Fall, Boston, Mass., Sep. 24-28, 2000). Also, mobiles may transmit signals with low power because of expected high smart antenna gains at a base station, and if only one element is employed for PN code synchronization, then the received signal-to-interference-plus-noise power ratio (SINR) at a base station may not be sufficient. As a result, a call drop may occur due to weak PN code tracking at a base station. It is more desirable for mobile users not to experience frequent call drops than to have high voice quality and fast PN code acquisition. These are among the motivations for a PN code chip time tracking loop (PNCTL) which can maintain its lock status for a longer time by utilizing all antenna elements instead of one element.

PN code acquisition using an antenna array has been addressed in other studies R. K. Madyastha and B. Aazhang, "Synch. and Detection of Spread Spectrum Signals in Multipath Channels Using Antenna Arrays", IEEE MILCOM, pp. 1170-1174, 1995 and S. Kim and S. L. Miller, "Subspace-based Synch. Using Antenna Array for DS-CDMA Signals in Multipath Time Varying Fading Channels", IEEE VTC Spring, pp. 547-551, Tokyo, May 2000) based on signal subspace techniques. However, many of these are difficult to implement because they require enormous computational loads, and also they assume short PN codes. The current and near future CDMA mobile applications e.g., the second generation (2G) and third (3G) CDMA systems (Andrew J. Viterbi, "CDMA Principle of Spread Spectrum Communication", Addison Wesley, N.Y., 1995 and Third Generation Partnership Project; "Spreading and Modulation (FDD)," 3GPP Technical Specification, TS25.213, v3.2.0, March 2000) have employed long PN codes. Also, a practical PN code acquisition scheme employing all smart antenna elements has been studied in Bing Wang and Hyuck M. Kwon, "PN Code Acquisition with Adaptive Antenna Array and Adaptive Threshold for DS-CDMA Wireless Communications", IEEE GLOBECOM, San Francisco, Calif., Nov. 27-Dec. 1, 2000. However, to the inventors' knowledge, practical PNCTLs using all smart antenna elements are not available yet. The invention employs all smart antenna elements for PN code tracking. Verification that tracking performance can be improved significantly when all smart antenna element outputs are added and fed into a typical noncoherent digital PNCTL is set forth herein.

Root-mean-square-chip-time-jitter (RMS) and mean-time-to-lose-lock (MTLL) are typical performance criteria for a PNCTL. Once the PN code is locked, longer MTLL is better for mobile users. Longer MTLL can be achieved as RMS gets smaller. Much analysis and design have appeared for analog and digital phase lock loop (DPLL) and PNCTLs, (e.g., Andrew J. Viterbi, "CDMA Principle of Spread Spectrum Communication", Addison Wesley, N.Y., 1995; H. Meyr and G. Ascheid, "Synch. in Digital Communications", John Wiley and Sons, 1990; R. De Gaudenzi, M. Luise, and R. Viola, "A Digital Chip Timing Recovery Loop for Band Limited Direct-Sequence Spread-Spectrum Signals", IEEE Trans. on Comm., Vol. 41, no. 11, pp. 1760-1769. November 1993; R. De Gaudenzi and M. Luise, "Decision Directed Coherent Delay Lock Tracking Loop for DS-Spread Spectrum Signals", IEEE Trans. on Comm., Vol. 39, No. 5, pp.

758-765, May 1991; R. De Gaudenzi, "Direct Sequence Spread Spectrum Chip Tracking in the Presence of Unresolvable Multipath Components", IEEE Trans. on Vehicular Technology, Vol. 48, No. 5, pp. 1573-1583, September 1999; and A. Weinberg and B. Liu, "Discrete Time Analysis of Nonuniform Sampling First and Second Order Digital Phase Lock Loops", IEEE Trans. on Comm., Vol. Com-22, No. 2, pp. 123-137, February 1974), under additive white Gaussian noise (AWGN) and fading environments. The analyses in these studies suggest that decreasing loop bandwidth or increasing desired signal transmitting power is the way to improve MTLL. However, the present invention, without changing loop bandwidth and desired signal power, improves MTLL by using all smart antenna elements since a smart antenna can improve the SINR output.

A typical noncoherent early-late gate PNCTL of the first and second order are considered herein (Andrew J. Viterbi, "CDMA Principle of Spread Spectrum Communication", Addison Wesley, N.Y., 1995.) Then, the analysis in R. De Gaudenzi, M. Luise, and R. Viola, "A Digital Chip Timing Recovery Loop for Band Limited Direct-Sequence Spread-Spectrum Signals", IEEE Trans. on Comm., Vol. 41, No. 11, pp. 1760-1769, November 1993 and R. De Gaudenzi and M. Luise, "Decision Directed Coherent Delay Lock Tracking Loop for DS-Spread Spectrum Signals", IEEE Trans. on Comm, Vol. 39, No. 5, pp. 758-765, May 1991, to the second order early-late gate PNCTL, while only the first order was studied in the first of these 2 references. Also, the analysis is extended (A. Weinberg and B. Liu, "Discrete Time Analysis of Nonuniform Sampling First and Second Order Digital Phase Lock Loops", IEEE Trans. on Comm., Vol. Com-22, No. 2, pp. 123-137, February 1974) to a fading environment and PNCTL because a typical mobile channel is under fading while Weinberg and Liu (in A. Weinberg and B. Liu, "Discrete Time Analysis of Nonuniform Sampling First and Second Order Digital Phase Lock Loops", IEEE Trans. on Comm., Vol. Com-22, No. 2, pp. 123-137, February 1974) presented the steady state phase error probability density function and variance of the first and second order DPLL only under an AWGN environment.

The proposed PNCTL of smart antennas in a 3G W-CDMA uplink dedicated physical control channel (DPCCH) has been simulated. To do that, the on-time array output was used as input to NLMS adaptive algorithm whose reference value is set to the number of elements, M. The NLMS algorithm requires only (3M+1) complex multiplication and 2M additions and does not require any phase calibration. Array outputs with early and late PN codes are used as inputs to the noncoherent PNCTL. In addition, loop bandwidth and RMS are expressed in terms of poles of the overall PNCTL transfer function for systematic design instead of using a trial and error method. Optimum pole locations to minimize RMS for the first and second order PNCTLs are found. Finally, through both analysis and simulation, significant improvements in RMS and MTLL are demonstrated.

BRIEF DESCRIPTION OF THE DRAWINGS

A more complete appreciation of the invention and many of the attendant advantages and features thereof will be readily understood by reference to the following detailed description when considered in connection with the accompanying drawings wherein.

DETAILED DESCRIPTION

1. Introduction

The present invention will be discussed with reference to preferred embodiments of methods and devices for psuedonoise code tracking loops. Specific details, such as numbers of antenna elements and the order of loop filters, are set forth in order to provide a through understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

Section 2 describes a noncoherent PNCTL. Section 3 presents analysis: (1) the overall transfer function of PNCTL, and (2) RMS and MTLL of the first and second orders under AWGN and fading environments. Section 4 shows both analysis and simulation results for RMS and MTLL. Section 5 makes conclusions.

2. System Modeling

Figure 1:
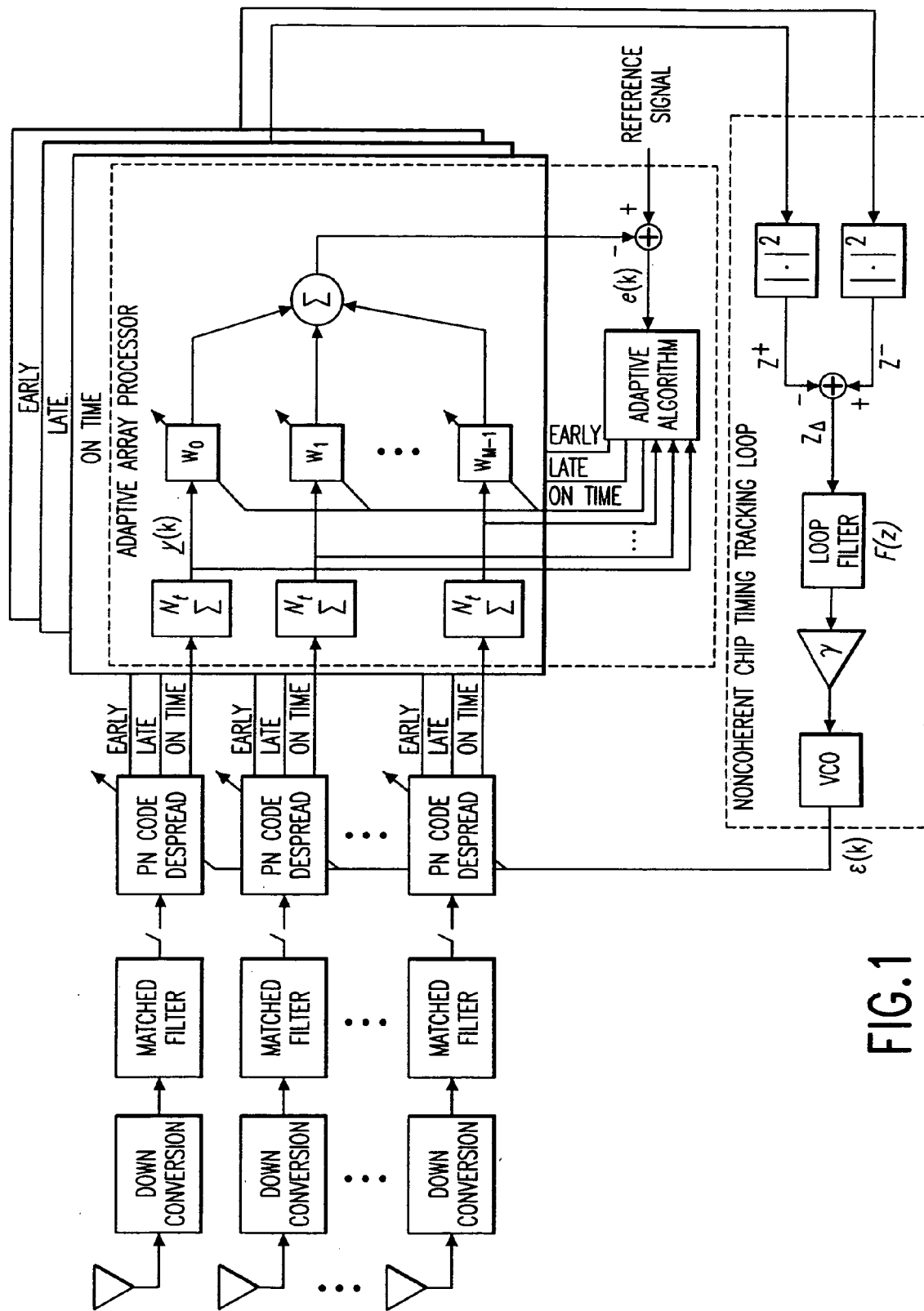
FIG. 1 is a block diagram of a noncoherent PN code chip time tracking loop (PNCTL) with a smart antenna according to an embodiment of the present invention.

FIG. 1 shows a block diagram of the proposed noncoherent PNCTL with smart antennas. A single dwell serial PN code search is considered for demonstration. Other search can be employed. When the received and local PN codes are synchronized within a fraction of a chip time, i.e., when PN code acquisition is achieved, the PNCTL in FIG. 1 is triggered. The DPCCH in the W-CDMA, or called 3GPP system (Third Generation Partnership Project, "Spreading and Modulation (FDD)", 3GPP Technical Specification, TS25.213, v3.2.0, March 2000), is used for the PN code chip time tracking demonstration. The received signal is down-converted and passed through matched filters. In the 3G W-CDMA system, a square root raised cosine (RRC) filter with frequency response H(f) is employed at both the transmitter and receiver with roll-off factor $\beta$=0.22. The impulse time response of the filter response H(f) can be written as $$RRC(t) = \frac{\sin\left(\pi\frac{t}{T_c}(1-\beta)\right) + 4\beta\frac{t}{T_c}\cos\left(\pi\frac{t}{T_c}(1-\beta)\right)}{\pi\frac{t}{T_c}\left(1-\left(4\beta\frac{t}{T_c}\right)^2\right)} \quad (1)$$

where $T_c$ is a chip time interval. The received signal is multiplied by three local PN codes. One code is advanced by $\Delta=T_c/2$ seconds for the early gate, another is delayed by $\Delta=T_c/2$ seconds for the late gate, and the third is on-time and used for signal demodulation. The outputs multiplied by the local PN codes are accumulated over $N_t$ chips to achieve processing gain, and denoted by an M×1 vector $\underline{y}(k)$ for M element antenna where k denotes the update index, i.e., $kN_tT_c$. An inner product $\underline{y}^H(k)w(k)$ is taken at every k to obtain an array output where superscripts H and T in the paper denote the Hermitian and transpose, respectively. The same weight vector $w(k)$ is multiplied to the three de-spread outputs to get array outputs. The on-time array output is fed into an adaptive algorithm to update the weight vector. The NLMS adaptive algorithm is used for weight vector updating (Simon Haykin, "Adaptive Filter Theory", pp. 437, Prentice Hall 1996). The reference value is set to the number of antenna elements M because ideal weight vector $w(k)$ should be matched with array response vector $a(\theta(k))=(1, e^{-j\pi\sin(\theta(k))}, \ldots, e^{-j(M-1)\pi\sin(\theta(k))})^T$ where $\theta(k)$ is the DOA from the desired signal, and ideal array output $w^H(k)a(\theta(k))$ would be equal to M. Array outputs for early and late gates are fed into the square devices in the PNCTL, FIG. 1, to measure energy. Measured energy is denoted by $Z^-$ and $Z^+$ for the advanced and delayed branches, respectively. Energy difference $Z_\Delta$ is passed through loop filter $F(z)$ and multiplied with loop filter gain $\gamma$. The voltage controlled oscillator (VCO) takes the loop filter output and controls the chip time shifting amount for the local PN code. The transfer function of VCO is modeled by $z^{-1}/(1-z^{-1})$ (Andrew J. Viterbi, "CDMA Principle of Spread Spectrum Communication", Addison Wesley, N.Y., 1995), where z denotes a sample delay. Four samples are taken per chip. The transfer function of loop filter is denoted by $F(z)$ and $$F(z) = 1 + \frac{az^{-1}}{1-z^{-1}}$$

for a second order PNCTL (Andrew J. Viterbi, "CDMA Principle of Spread Spectrum Communication", Addison Wesley, N.Y., 1995, pp. 66). The first order PNCTL is a special case of the second order with a=0, where a is for the Doppler rate compensation. The loop parameters a and $\gamma$ are determined for given loop bandwidths or pole locations. The Jakes Rayleigh fading model is employed for multipath simulation.

3. Analysis

Inverse Fourier transform of $|H(f)|^2$ can be written as $$g(\tau) = \frac{\cos(\pi\beta\tau/T_c)}{1-(2\beta\tau/T_c)^2}\frac{\sin(\pi\tau/T_c)}{\pi\tau/T_c} \quad (2)$$

where $H(f)$ is the RRC frequency response of time response in (1). The output of the receiver matched filter in FIG. 1 is proportional to $g(\tau)$ because the transmitter also employs a square root raised cosine filter $H(f)$. If samples of $g(\tau)$ are taken at integer times $T_c$, then there would be no degradation in desired signal power when the PN code is synchronized. Let $\epsilon=\tau/T_c$ denote the normalized chip timing error. Then, $g(\tau)$ at $\tau=\epsilon T_c$ is $$g(\varepsilon T_c) = \frac{\cos(\pi\beta\varepsilon)}{1-(2\beta\varepsilon)^2}\frac{\sin(\pi\varepsilon)}{\pi\varepsilon}. \quad (3)$$

The loop error characteristic of early and late gate PNCTL (Andrew J. Viterbi, "CDMA Principle of Spread Spectrum Communication", Addison Wesley, N.Y., 1995) can be written as $$\eta(\varepsilon) = g^2\left[\left(\varepsilon-\frac{1}{2}\right)T_c\right] - g^2\left[\left(\varepsilon+\frac{1}{2}\right)T_c\right] \quad (4)$$

by using (3) where early and late gates employ a half chip delayed and advanced version of received samples. The PNCTL characteristic can be assumed to be linear when chip time error $\epsilon$ is small. The slope at $\epsilon=0$ is obtained by taking a derivative of (4) as $$\kappa \equiv \left.\frac{d\,\eta(\varepsilon)}{d\,\varepsilon}\right|_{\varepsilon=0}$$

$$= 16\cos\left(\frac{\beta\pi}{2}\right)\frac{\beta\pi(1-\beta^2)\sin(\pi\beta/2) + 2(1-3\beta^2)\cos(\pi\beta/2)}{\pi^2(1-\beta^2)^3}$$

$$\cong 3.2416 \quad (5)$$

where $\beta=0.22$ is used. Let $Z_\Delta$ denote the energy difference between the early and late branches in FIG. 1. Then, average energy difference can be written as $$E[Z_\Delta]=N_t^2 E_c\eta(\epsilon)\cong N_t^2 E_c\kappa \quad (6)$$

by using the loop error characteristic in (4) (Andrew J. Viterbi, "CDMA Principle of Spread Spectrum Communication", Addison Wesley, N.Y., 1995).

Figure 2:
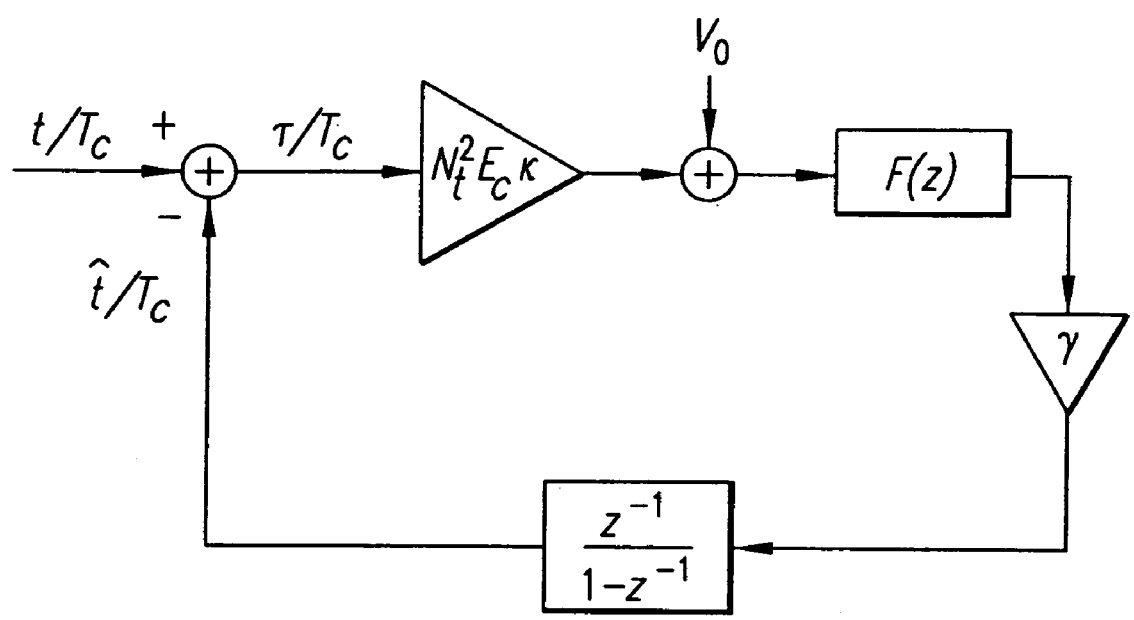
FIG. 2 is an equivalent PN code chip time tracking loop (PNCTL) using a linear model.

FIG. 2 shows an equivalent PNCTL model using (6) where $V_0$ is an upper bound of total interference variance in the tracking loop when a smart antenna is employed and can be written as $$V_0=2N_t^2(I_{0,in}/M)^2(1+2N_tE_c/(I_{0,in}/M)) \quad (7)$$

where $I_{0,in}/2$ is variance of input interference fed into each antenna element (Y. S. Song, H. M. Kwon, and B. J. Min, "Computationally Efficient Smart Antennas for CDMA Wireless Comm.", IEEE Trans. On Vehicular Technology, Vol. 50, No. 6, November 2001; Andrew J. Viterbi, "CDMA Principle of Spread Spectrum Communication", Addison Wesley, N.Y., 1995; Yoo S. Song, Hyuck M. Kwon, and Byung J. Min, "Smart Antennas for 3G and Future Generation CDMA", IEEE International Conference on Phased Array Systems and Technology, Dana Point, Calif., pp. 69-72, May 21-25, 2000). The overall loop transfer function can be found from the equivalent PNCTL as $$H(z) = \frac{N_t^2 E_c \kappa \gamma F(z) \frac{z^{-1}}{1-z^{-1}}}{1+N_t^2 E_c \kappa \gamma F(z) \frac{z^{-1}}{1-z^{-1}}} = \frac{N_t^2 E_c \kappa \gamma F(z) z^{-1}}{1-z^{-1}+N_t^2 E_c \kappa \gamma F(z) z^{-1}} \quad (8)$$

which is equal to that of the single antenna element case (Andrew J. Viterbi, "CDMA Principle of Spread Spectrum Communication", Addison Wesley, N.Y., 1995). The major difference between a smart antenna and a single antenna element is interference suppressed by a factor M as (7).

3.1. Root Mean Square Chip Time Jitter (RMS) Analysis

By using $$F(z) = 1 + \frac{az^{-1}}{1-z^{-1}} \quad (20)$$

for the second order PNCTL, (8) can be rewritten as $$H(z) = \frac{N_t^2 E_c \kappa \gamma (z^{-1} - (1-a)z^{-2})}{1+(-2+N_t^2 E_c \kappa \gamma)z^{-1}+(1-N_t^2 E_c \kappa \gamma (1-a))z^{-2}}. \quad (9)$$

Let $p_1$ and $p_2$ denote two poles of H(z) in (9). Then, the two poles satisfy the following:

$$p_1 + p_2 = 2 - N_t^2 E_c \kappa \gamma \quad (10\text{-a})$$

and $$p_1 p_2 = 1 - N_t^2 E_c \kappa \gamma (1-a). \quad (10\text{-b})$$

Therefore, loop filter gain $\gamma$ and Doppler rate compensation coefficient a can be expressed in terms of poles as $$\gamma = \frac{2-p_1-p_2}{N_t^2 E_c \kappa} \quad (11\text{-a})$$

and $$a = \frac{1-p_1-p_2+p_1 p_2}{2-p_1-p_2}. \quad (11\text{-b})$$

Variance of chip time error for the second order PNCTL is derived in Appendix in detail and can be written as $$\text{Var}\left(\frac{\tau}{T_c}\right) = \frac{V_0}{(N_t^2 E_c \kappa)^2} \oint H(z)H(z^{-1}) \frac{dz}{2\pi i z} \quad (12)$$

$$= \frac{V_0 \gamma^2}{(N_t^2 E_c \kappa \gamma)^2 (a-1)} \frac{2a+2N_t^2 E_c \kappa \gamma - 3aN_t^2 E_c \kappa \gamma + a^2 N_t^2 E_c \kappa \gamma}{(2N_t^2 E_c \kappa \gamma - aN_t^2 E_c \kappa \gamma - 4)}$$

while variance of the first order PNCTL is shown in (Andrew J. Viterbi, "CDMA Principle of Spread Spectrum Communication", pp. 66, Addison Wesley, N.Y., 1995) which is a special case of (12) with a=0. One-side loop bandwidth in Hertz is given as $$B_L = \int_0^{\pi/T_c} [H(e^{j\omega T_c})H(e^{-j\omega T_c})] \frac{d\omega}{2\pi}. \quad (13)$$

Thus, (12) can be expressed in terms of loop bandwidth by using (13) as $$\text{Var}\left(\frac{\tau}{T_c}\right) = \frac{2V_0 B_L T_c}{(N_t^2 E_c \kappa)^2}. \quad (14)$$

Normalized loop bandwidth of the second order PNCTL can be obtained from (12) and (14) and expressed in terms of poles with (10) as $$B_L T_c = \frac{2a+2N_t^2 E_c \kappa \gamma - 3aN_t^2 E_c \kappa \gamma + a^2 N_t^2 E_c \kappa \gamma}{2(a-1)(2N_t^2 E_c \kappa \gamma - aN_t^2 E_c \kappa \gamma - 4)} \quad (15)$$

$$= \frac{2(2-p_1-p_2)+a(p_1 p_2+2p_1+2p_2-3)}{-2(a-1)(p_1 p_2+p_1+p_2+1)}.$$

RMS of the second order PNCTL can be obtained by taking the square root of (12) or (14). However, it is more useful to represent RMS in terms of loop bandwidth as $$\sigma_\varepsilon = \frac{\sqrt{2V_0 B_L T_c}}{N_t^2 E_c \kappa}. \quad (16)$$

Equation (16) shows that RMS is proportional to loop bandwidth $B_L T_c$.

To find the optimum poles that minimize variance of chip time error, we take a derivative of (12) with respect to $p_1$ and $p_2$, after substituting (11) into (12) as $$\left.\frac{\partial^2}{\partial p_1 \partial p_2} \text{Var}\left(\frac{\tau}{T_c}\right)\right|_{\gamma=\frac{2-p_1-p_2}{N_t^2 E_c \kappa}, a=\frac{1-p_1-p_2+p_1 p_2}{2-p_1-p_2}} = \quad (17)$$

$$\frac{V_0}{(N_t^2 E_c \kappa)^2} \tilde{f}(p_1, p_2) = 0$$

where $$\tilde{f}(p_1, p_2) = \frac{Num_{\tilde{f}}}{Den_{\tilde{f}}} \quad (18)$$

$$\begin{aligned}Num_{\tilde{f}} = & p_1^3 p_2^3 + 2p_1^2 p_2^3 + p_1 p_2^3 + 2p_1^3 p_2^2 - 11 p_1^2 p_2^2 - 4 p_1 p_2^2 + \\ & p_2^2 + p_1^3 p_2 - 4 p_1^2 p_2 + 13 p_1 p_2 + 2 p_2 + p_1^2 + 2 p_1 - 7\end{aligned} \quad (19)$$

$$Den_{\tilde{f}} = 0.5(1+p_1)(1+p_2)(p_1 p_2 - 1)^3 (1+p_1+p_2+p_1 p_2). \quad (20)$$

Figure 3:
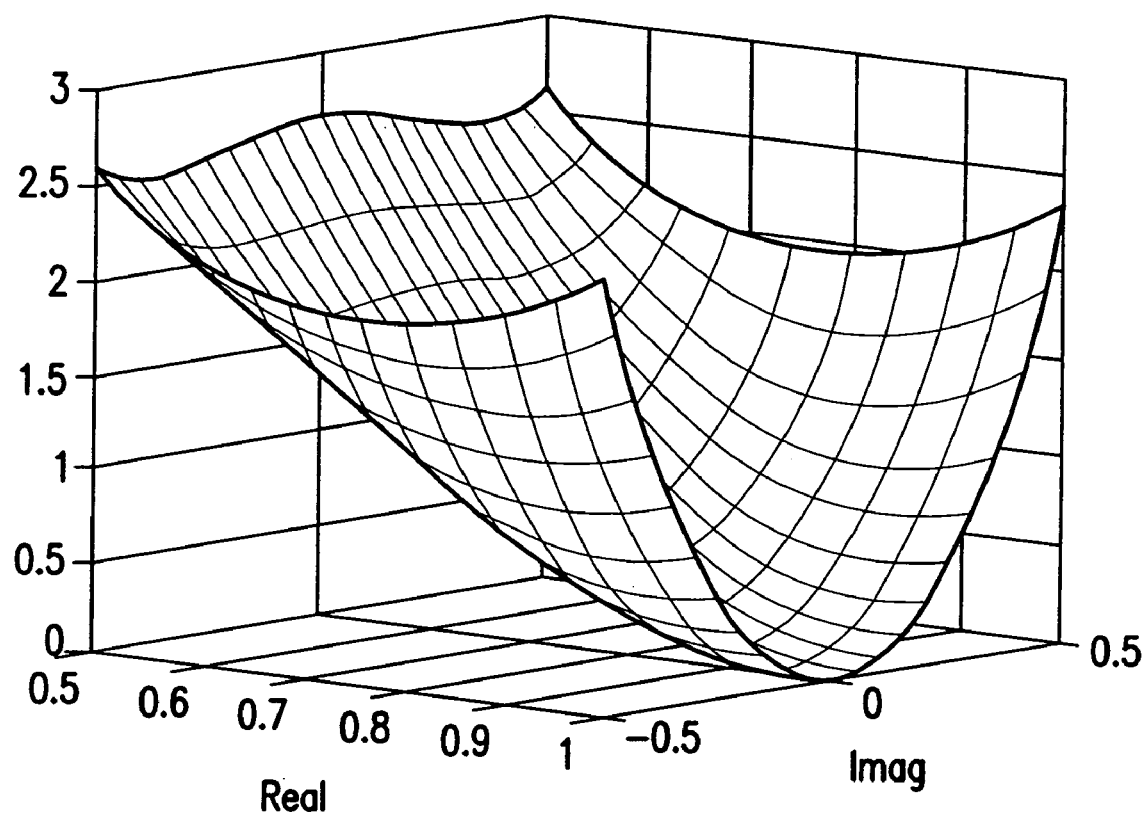
FIG. 3 is a plot of the magnitude $|f(p_1,p_2)|$ in e.g. (17) versus pole locations.

FIG. 3 shows magnitude $|\tilde{f}(p_1,p_2)|$ by varying two pole locations, $p_1$ and $p_2$. If two poles $p_1$ and $p_2$ are located in the right hand side of unit circle z-domain, it is observed that $|\tilde{f}(p_1,p_2)|$ approaches zero as poles are close to 1 on the real axis. This implies that optimum pole locations are equal to 1. Therefore, variance of chip time error will be minimum as poles approach 1 on the real axis. However, pole locations are not allowed to exceed, nor to equal, 1 because of tracking loop stability.

Under fading environment, (7) can be modified into conditional variance of interference $V_{0|\alpha}$ for given fading amplitude a as $$V_{0|\alpha} 2N_t^2(I_{0,in}/M)^2 + 4\alpha^2 N_t^3(I_{0,in}/M)E_c. \tag{21}$$

Then, the average variance of chip timing error under fading environment can be obtained with a probability density function (pdf) of fading amplitude, $p_R(\alpha)$, as $$\text{Var}\left(\frac{\tau}{T_c}\right) = \int_0^\infty \text{Var}\left(\frac{\tau}{T_c} \mid \alpha\right) p_R(\alpha) d\alpha \tag{22}$$

where $$\text{Var}\left(\frac{\tau}{T_c} \mid \alpha\right) = \frac{V_{0|\alpha}}{(N_t^2 \alpha^2 E_c)^2 \kappa^2} \oint H(z \mid \alpha) H(z^{-1} \mid \alpha) \frac{dz}{2\pi i z} = \tag{23}$$

$$\frac{V_{0|\alpha}}{(N_t^2 \alpha^2 E_c \kappa)^2 (a-1)} \cdot \frac{2a + 2N_t^2 \alpha^2 E_c \kappa \gamma - 3aN_t^2 \alpha^2 E_c \kappa \gamma + a^2 N_t^2 \alpha^2 E_c \kappa \gamma}{2N_t^2 \alpha^2 E_c \kappa \gamma - aN_t^2 \alpha^2 E_c \kappa \gamma - 4}$$

For a Rayleigh fading model, $$p_R(\alpha) = \frac{\alpha}{\sigma_\alpha^2} e^{\frac{-\alpha^2}{2\sigma_\alpha^2}} \tag{24}$$

where $\sigma_\alpha^2 = 1$. RMS under fading channel can be obtained by taking a square root of (22).

Similarly, analysis for the first order PNCTL can be done as a special case of the second order with a=0 in (9)-(23). The first order PNCTL transfer function has a single pole p at $1-N_t^2 E_c \kappa \gamma$, and loop filter gain $\gamma$ can be expressed in terms of the pole as $\gamma = (1-p)/N_t^2 E_c \kappa$. And normalized loop bandwidth of the first order PNCTL can be written as $$B_L T_c = \frac{N_t^2 E_c \kappa \gamma}{2(2 - N_t^2 E_c \kappa \gamma)} = \frac{1-p}{2(1+p)}. \tag{25}$$

RMS of the first order PNCTL can be obtained by replacing $B_L T_c$ in (14) with (25) and taking a square root of (14). The optimum pole location that minimizes variance (or RMS) can be found by replacing $\gamma$ with $(1-p)/N_t^2 E_c \kappa$ and taking a derivative of variance with respect to p as $$\frac{d}{dp}\left(\frac{V_0 \gamma}{N_t^2 E_c \kappa (2 - N_t^2 E_c \kappa \gamma)}\right)\bigg|_{\gamma = \frac{1-p}{N_t^2 E_c \kappa}} = \frac{V_0(-2)}{(N_t^2 E_c \kappa)^2 (1+p)^2} < 0. \tag{26}$$

Note from (26) that the derivative is negative, which implies that variance decreases asp increases. Therefore, RMS will be minimum when p is 1. RMS of the first order PNCTL under fading environment can be obtained similar to (22).

3.2. Mean Time to Lose Lock (MTLL) Analysis

Loop noise $\Delta r(k)$ of variance $V_0$ in FIG. 2 is the difference between $Z_\Delta(k)$ and its average $E[Z_\Delta(k)]$ and can be written as $$N(k) = Z_\Delta(k) - E[Z_\Delta(k)] = Z_\Delta(k) - N_t^2 E_c \eta \{\epsilon(k)\} \tag{27}$$

from (6) where k denotes the PNCTL update index. Since loop filter F(z) can be represented as $1 + az^{-1}/(1-z^{-1})$ for the second order PNCTL and $\epsilon(k)$ is the VCO output in FIG. 1, the z-transform of $\epsilon(k)$ can be written as $$\varepsilon(z) = \gamma\left(-\frac{z^{-1}}{1-z^{-1}}\right)\left(1 + \frac{az^{-1}}{1-z^{-1}}\right) Z_\Delta(z) \tag{28}$$

where the negative sign is used in (28) because the VCO output is subtracted from the input timing in FIG. 2. $Z_\Delta(z)$ in (28) denotes the forward z-transform for $Z_\Delta(k)$. By taking the inverse z-transform, (28) can be rewritten as $$\varepsilon(k) - 2\varepsilon(k-1) + \varepsilon(k-2) = \tag{29}$$

$$-\gamma[Z_\Delta(k-1) + (a-1)Z_\Delta(k-2)] = -\gamma N_t^2 E_c \eta\{\varepsilon(k-1)\} -$$

$$\gamma N(k-1) - (a-1)[\gamma N_t^2 E_c \eta\{\varepsilon(k-2)\} + \gamma N(k-2)].$$

Let $\epsilon(k) \equiv s(k+1) + (a-1)s(k)$. Then (29) becomes $$[s(k+1) - 2s(k) + s(k-1)] + (a-1)[s(k) - 2s(k-1) + s(k-2)] = \tag{30}$$

$$-\gamma N_t^2 E_c \eta\{s(k) + (a-1)s(k-1)\} - \gamma N(k-1) +$$

$$(a-1)[-\gamma N_t^2 E_c \eta\{s(k-1) + (a-1)s(k-2)\} - \gamma N(k-2)].$$

Equation (30) can be broken into two equivalent equations. Let $y_1(k) = s(k-2)$ and $y_2(k) = s(k-1)$. Then, (30) can be rewritten as the following state equations:

$$y_1(k+1) = y_2(k)$$

$$y_2(k+1) = 2y_2(k) - y_1(k) - \gamma N_t^2 E_c \eta(y_2(k) + (a-1)y_1(k)) - \gamma N(k-2) \tag{31}$$

where $$\epsilon(k) = y_2(k+2) + (a-1)y_1(k+2). \tag{32}$$

The $y_1(k)$ and $y_2(k)$ are discrete time continuous variable Markov processes. The joint pdf of $y_1(k)$ and $y_2(k)$ satisfies the Chapman-Kolmogorov equation (A. Weinberg and B. Liu, "Discrete Time Analysis of Nonuniform Sampling First and Second Order Digital Phase Lock Loops," IEEE Trans. on Comm., Vol. Com-22, No. 2, pp. 123-137, February 1974) as $$p_{k+1}(y_1, y_2 \mid y_{1,0}, y_{2,0}) = \tag{33}$$

$$\int_{-\infty}^\infty \int_{-\infty}^\infty q_k(y_1, y_2 \mid x_1, x_2) p_k(x_1, x_2 \mid y_{1,0}, y_{2,0}) dx_1 dx_2$$

where $y_{1,0} = y_1(0)$ and $y_{2,0} = y_2(0)$ are the initial chip timing errors, $p_k(\bullet, \bullet \mid y_{1,0}, y_{2,0})$ is the joint pdf of $y_1(k)$ and $y_2(k)$ for given $y_{1,0}$ and $y_{2,0}$, and $q_k(y_1, y_2 \mid x_1, x_2)$ is the joint transition pdf of $y_1(k+1)$ and $y_2(k+1)$ for given $y_1(k) = x_1$ and $y_2(k) = x_2$. Noting that noise N(k) is independent of $y_1(k)$ and $y_2(k)$, we can observe from (31) that $y_2(k+1)$ for given $(y_1(k) = x_1, y_2(k) = x_2)$ is Gaussian with mean and variance equal to $E_k(y_1, y_2 \mid x_1, x_2) = 2x_2 - x_1 - \gamma N_t^2 E_c \eta(x_2 + (a-1)x_1)$ and $\gamma^2 V_0$, respectively. Thus, the conditional density of $y_2(k+1)$, given $(y_1(k) = x_1, y_2(k) = x_2)$, is independent of k since the channel is assumed to be stationary. Therefore, from (31), one obtains $$q_k(y_1, y_2 \mid x_1, x_2) = \qquad (34)$$

$$\delta(y_1 - x_2) \frac{1}{\sqrt{2\pi\gamma^2 V_0}} \exp\left[-\frac{(y_2 - 2x_2 + x_1 + \gamma N_t^2 E_c \eta(x_2 + (a-1)x_1))^2}{2\gamma^2 V_0}\right].$$

Then (33) becomes $$p_{k+1}(y_1, y_2) = \int_{-\infty}^{\infty} \frac{1}{\sqrt{2\pi\gamma^2 V_0}} \exp\left[-\frac{(y_2 - 2y_1 + x_1 + \gamma N_t^2 E_c \eta(y_1 + (a-1)x_1))^2}{2\gamma^2 V_0}\right] p_k(x_1, y_1) dx_1 \qquad (35)$$

$$= \int_{-\infty}^{\infty} K(y_1, y_2, x_1) p_k(x_1, y_1) dx_1$$

where $$K(y_1, y_2, x_1) = \qquad (36)$$

$$\frac{1}{\sqrt{2\pi\gamma^2 V_0}} \exp\left[-\frac{(y_2 - 2y_1 + x_1 + \gamma N_t^2 E_c \eta(y_1 + (a-1)x_1))^2}{2\gamma^2 V_0}\right].$$

From (31), and since N(k−1) is Gaussian with zero mean and variance $V_0$, $y_1(k+1)$ and $y_2(k+1)$ will be also jointly Gaussian for all k with zero means. The jointly Gaussian density function is written as $$p_{k+1}(y_1, y_2) = \frac{1}{2\pi\sigma^2(k+1)\sqrt{1-\rho^2(k+1)}} \exp\left\{-\frac{y_1^2 - 2\rho(k+1)y_1 y_2 + y_2^2}{2[1-\rho^2(k+1)]\sigma^2(k+1)}\right\} \qquad (37)$$

where $\sigma^2(k+1)$ and $\rho(k+1)$ denote variances of $y_1(k+1)$ and $y_2(k+1)$ and their correlation coefficients, respectively. The $\rho(k+1)$ and $\sigma(k+1)$ are two unknown variables and can be obtained from (35) and (37) by computing two pair points $(y_1, y_2)$ recursively for each k and assuming that the digital loop is initially locked, i.e., $y_{1,0}=0$ and $y_{2,0}=0$, i.e., $p_0(y_1, y_2) = \delta(y_1, y_2)$, where $\delta(x)$ is the Dirac delta function. For example, $$p_{k+1}(0, 0) = \frac{1}{2\pi\sigma^2(k+1)\sqrt{1-\rho^2(k+1)}} \qquad (38)$$

$$= \frac{1}{2\pi\sigma^2(k)\sqrt{2\pi\gamma^2 V_0}\sqrt{1-\rho^2(k)}} \int_{-\infty}^{\infty} \exp\left[-\frac{(x_1 + \gamma N_t^2 E_c \eta((a-1)x_1))^2}{2\gamma^2 V_0} - \frac{x_1^2}{2[1-\rho^2(k)]\sigma^2(k)}\right] dx_1$$

and $$p_{k+1}(n, 0) = \frac{1}{2\pi\sigma^2(k+1)\sqrt{1-\rho^2(k+1)}} \exp\left\{-\frac{n^2}{2[1-\rho^2(k+1)]\sigma^2(k+1)}\right\} \qquad (39)$$

$$= \frac{1}{2\pi\sigma^2(k)\sqrt{2\pi\gamma^2 V_0}\sqrt{1-\rho^2(k)}} \int_{-\infty}^{\infty} \exp\left[-\frac{(-2n + x_1 + \gamma N_t^2 E_c \eta(n + (a-1)x_1))^2}{2\gamma^2 V_0} - \frac{x_1^2 - 2\rho(k)x_1 n + n^2}{2(1-\rho^2(k))\sigma^2(k)}\right] dx_1$$

where n is any nonzero real number and set to 0.01. We compute the rightmost terms in (38) and (39) numerically and recursively for each k to obtain $p_{k+1}(0,0)$ and $p_{k+1}(n,0)$. Thus, we have $$\sigma^2(k+1) = \frac{1}{2\pi\sqrt{1-\rho^2(k+1)}\, p_{k+1}(0,0)} \qquad (40)$$

$$p_{k+1}(n, 0) = p_{k+1}(0, 0) \exp\left\{-\frac{n^2 \pi p_{k+1}(0, 0)}{\sqrt{1-\rho^2(k+1)}}\right\} \qquad (41)$$

Using (40) and (41), we can solve $\rho(k+1)$ as $$\rho(k+1) = \frac{\sqrt{-4AC}}{2A}, \; |\rho(k+1)| < 1. \qquad (42)$$

where $$A = \left[\ln\left(\frac{p_k(n, 0)}{p_{k+1}(0, 0)}\right)\right]^2 \text{ and}$$

$$C = (n^2)^2 \pi^2 p_{k+1}^2(0, 0) - \left[\ln\left(\frac{p_k(n, 0)}{p_{k+1}(0, 0)}\right)\right]^2.$$

Also, we can have $\sigma^2(k+1)$ by substituting $\rho(k+1)$ in (42) into (40).

The mean and variance of timing error $\epsilon(k)$ can be obtained from (32) as $$\mu_{\epsilon,k} = \int_{-\infty}^{\infty}\int_{-\infty}^{\infty} [y_2 + (a-1)y_1] p_{k+2}(y_1, y_2) dy_1 dy_2 = 0 \qquad (43)$$

and $$\sigma_{\epsilon,k}^2 = \int_{-\infty}^{\infty}\int_{-\infty}^{\infty} [y_2 + (a-1)y_1 - \mu_{\epsilon,k}]^2 p_{k+2}(y_1, y_2) dy_1 dy_2 \qquad (44)$$

$$= \sigma^2(k+2) + 2(a-1)\sigma^2(k+2)\rho(k+2) + (a-1)^2 \sigma^2(k+2).$$

Therefore, the pdf of chip timing error ε(k) can be written as $$p_k(\varepsilon) = \frac{1}{\sqrt{2\pi\sigma_{\varepsilon,k}^2}} \exp\left[-\frac{(\varepsilon - \mu_{\varepsilon,k})^2}{2\sigma_{\varepsilon,k}^2}\right]. \quad (45)$$

The probability that the timing error is out of the limit $\pm\varepsilon_L$ for the first time at the k-th iteration is denoted by $P_k$ and can be written as $$P_k = Pr\{\text{\# of iterations} = k \text{ for which } |\varepsilon_k| \geq \varepsilon_L\} \quad (46)$$

$$= Pr\{\text{\# of iterations} \leq k \text{ for which } |\varepsilon_k| \geq \varepsilon_L\} -$$

$$Pr\{\text{\# of iterations} < k \text{ for which } |\varepsilon_k| \geq \varepsilon_L\}$$

$$= \left(1 - \int_{-\varepsilon_L}^{\varepsilon_L} p_k(\varepsilon)d\varepsilon\right) - \left(1 - \int_{-\varepsilon_L}^{\varepsilon_L} p_{k-1}(\varepsilon)d\varepsilon\right) =$$

$$\int_{-\varepsilon_L}^{\varepsilon_L} p_{k-1}(\varepsilon)d\varepsilon - \int_{-\varepsilon_L}^{\varepsilon_L} p_k(\varepsilon)d\varepsilon.$$

Therefore, MTLL will be $$MTLL = \quad (47)$$

$$\sum_{k=1}^{\infty} kP_k = \sum_{k=1}^{\infty} k\left(\int_{-\varepsilon_L}^{\varepsilon_L}[p_{k-1}(\varepsilon) - p_k(\varepsilon)]d\varepsilon\right) = 1 + \sum_{k=1}^{\infty} \int_{-\varepsilon_L}^{\varepsilon_L} p_k(\varepsilon)d\varepsilon.$$

Under fading environment, first we obtain the conditional probability density of the timing error ε(k) for a given fading amplitude α similarly to (45), and then take an average of the conditional pdf. Thus, the MTLL can be obtained under fading environment. For example, under fading environment, the steady state pdf of ε can be written as $$p(\varepsilon) = \int_0^\infty \alpha\left(\frac{1}{\sqrt{2\pi\sigma_{\varepsilon|\alpha}^2}}\exp\left[-\frac{\varepsilon^2}{2\sigma_{\varepsilon|\alpha}^2}\right]\right)e^{-\frac{\alpha^2}{2}}d\alpha \quad (48)$$

where $$\sigma_{\varepsilon|\alpha}^2 = \int_{-\infty}^{\infty}\int_{-\infty}^{\infty}[y_2 + (a-1)y_1]^2 p(y_1, y_2|\alpha)dy_1 dy_2 \quad (49)$$

$$p(y_1, y_2|\alpha) = \quad (50)$$

$$\int_{-\infty}^{\infty} \frac{1}{\sqrt{2\pi\gamma^2 V_{0|\alpha}}}\exp\left[-\frac{(y_2 - 2y_1 + x + \gamma\alpha^2 N_t^2 E_c\eta(y_1 + (a-1)x))^2}{2\gamma^2 V_{0|\alpha}}\right]p(x, y_1)dx$$

and $V_{0|\alpha}$ is given in (21).

The MTLL for the first order PNCTL in (R. DeGaudenzi, M. Luise, and R. Viola, "A Digital Chip Timing Recovery Loop for Band Limited Direct-Sequence Spread-Spectrum Signals," IEEE Trans. on Comm., Vol. 41, No. 11, pp. 1760-1769, November 1993) is a special case of the second order PNCTL described herein, with a=0.

4. Numerical and Simulation Results

For simulation, the DOA of the desired signal was chosen arbitrarily between −90° and 90° with a zero angle spread. Interference was added at each antenna element with a mean of zero and a variance of $I_{0,in}/2$. A linear array of M=4 antenna elements was assumed. The constant parameter and convergence parameter in the NLMS were chosen as 0.1 and 1.5, respectively. The number of chip intervals $N_t$ for energy accumulation was set to spreading factor 256 of DPCCH. The antenna weight vector and PNCTL were updated at every control symbol time=0.006 ms. Normalized bandwidth $B_L T_c$ was chosen as 0.0556. The corresponding pole for the first order PNCTL was 0.8. The corresponding pole locations for the second order PNCTLs were 0.9 and 0.9364. Also the RRC filter specified in W-CDMA was used, and so κ=3.2.

Jakes fading model was used with mobile speeds in the range of 10 km/h and 1000 km/h. Although results are not shown in this paper, it was observed that RMS chip time jitter and MTLL are not sensitive to mobile speeds. This may be due to noncoherent energy detection in the tracking loop.

Figure 4:
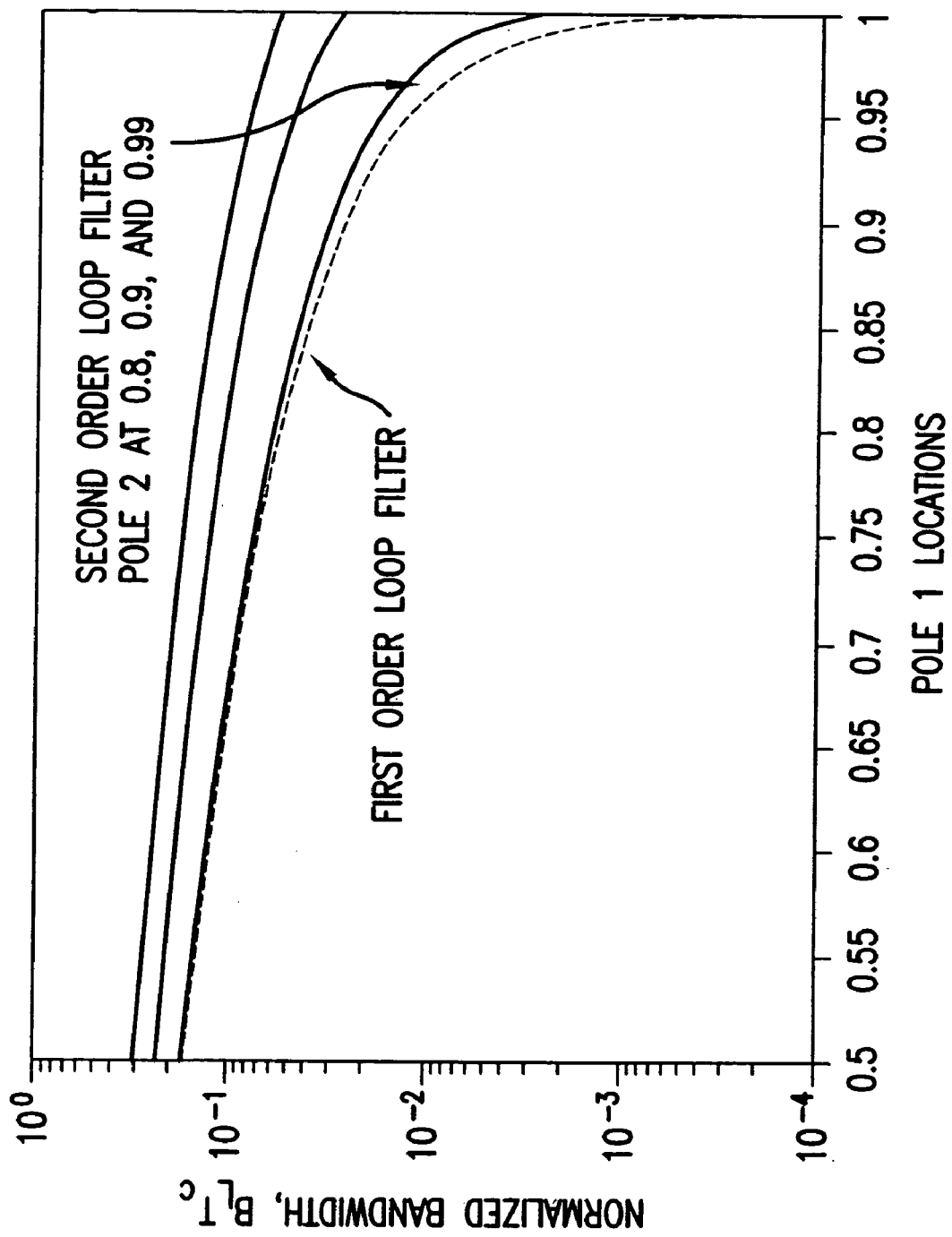
FIG. 4 is a plot of a normalized loop bandwidth $B_L T_c$ for the first and second order PN code tracking loops (PNCTLs) using equations (25) and (15), when chip rate is 3.84 Mcps and window size $N_t$ is 256 chips for energy accumulation, as a function of pole location.

FIG. 4 shows normalized bandwidth $B_L T_c$ versus the second pole location[1] with the first pole location as a parameter using (25) and (15) for the second order PNCTL, respectively. As the pole approaches 1, the bandwidth gets smaller, which means RMS decreases according to (16) and MTLL increases as indicated in (R. DeGaudenzi, M. Luise, and R. Viola, "A Digital Chip Timing Recovery Loop for Band Limited Direct-Sequence Spread-Spectrum Signals," IEEE Trans. on Comm., Vol. 41, No. 11, pp. 1760-1769, November 1993).

[1] For the first order PNCTL, the pole location in the horizontal axis of FIG. 4 represents its single pole location.

Figure 5:
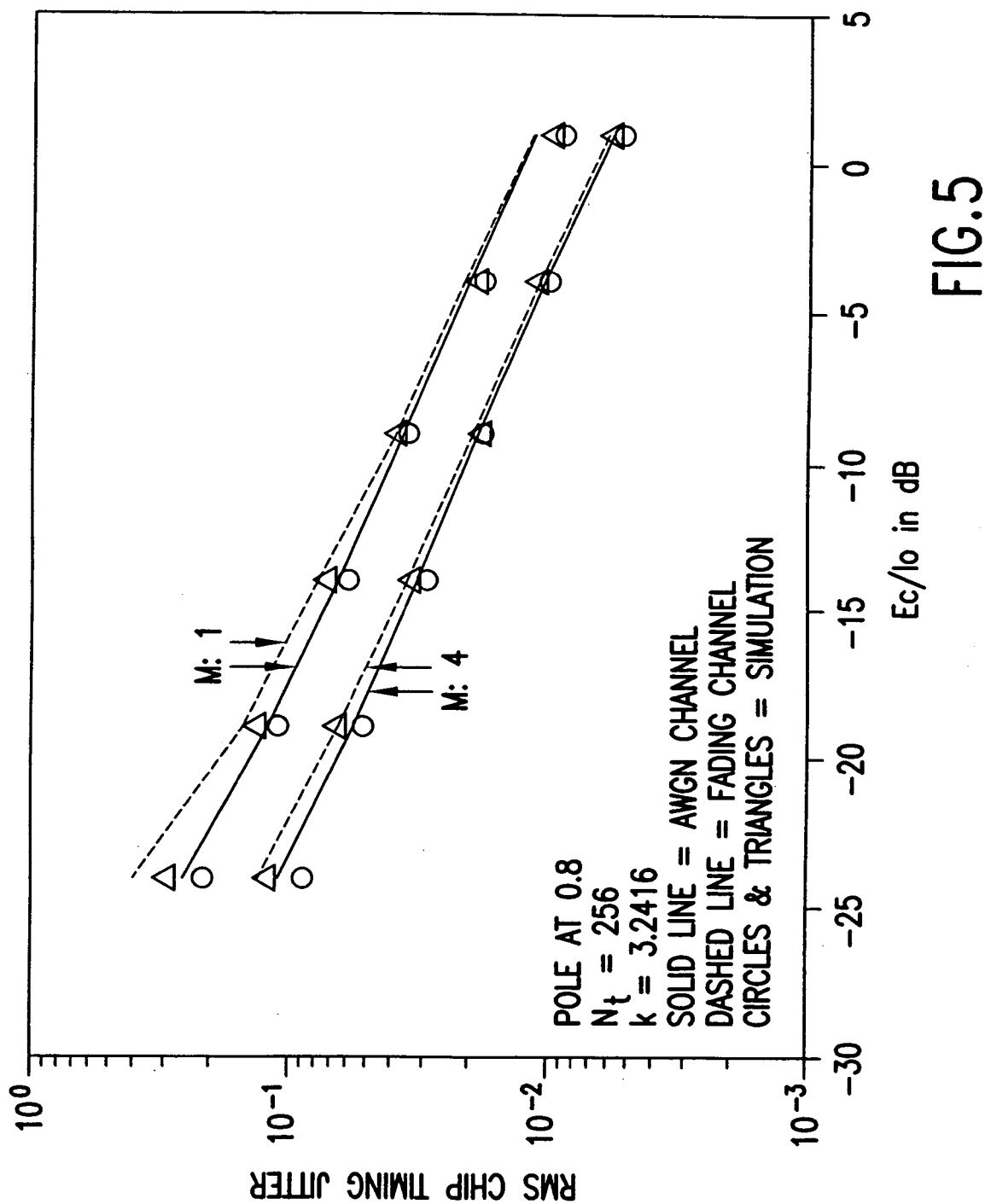
FIG. 5 is a plot of a root mean square (RMS) chip time jitter of the first order PN code tracking loop under fading and AWGN environments with the number of antenna elements M as a parameter.
Figure 6:
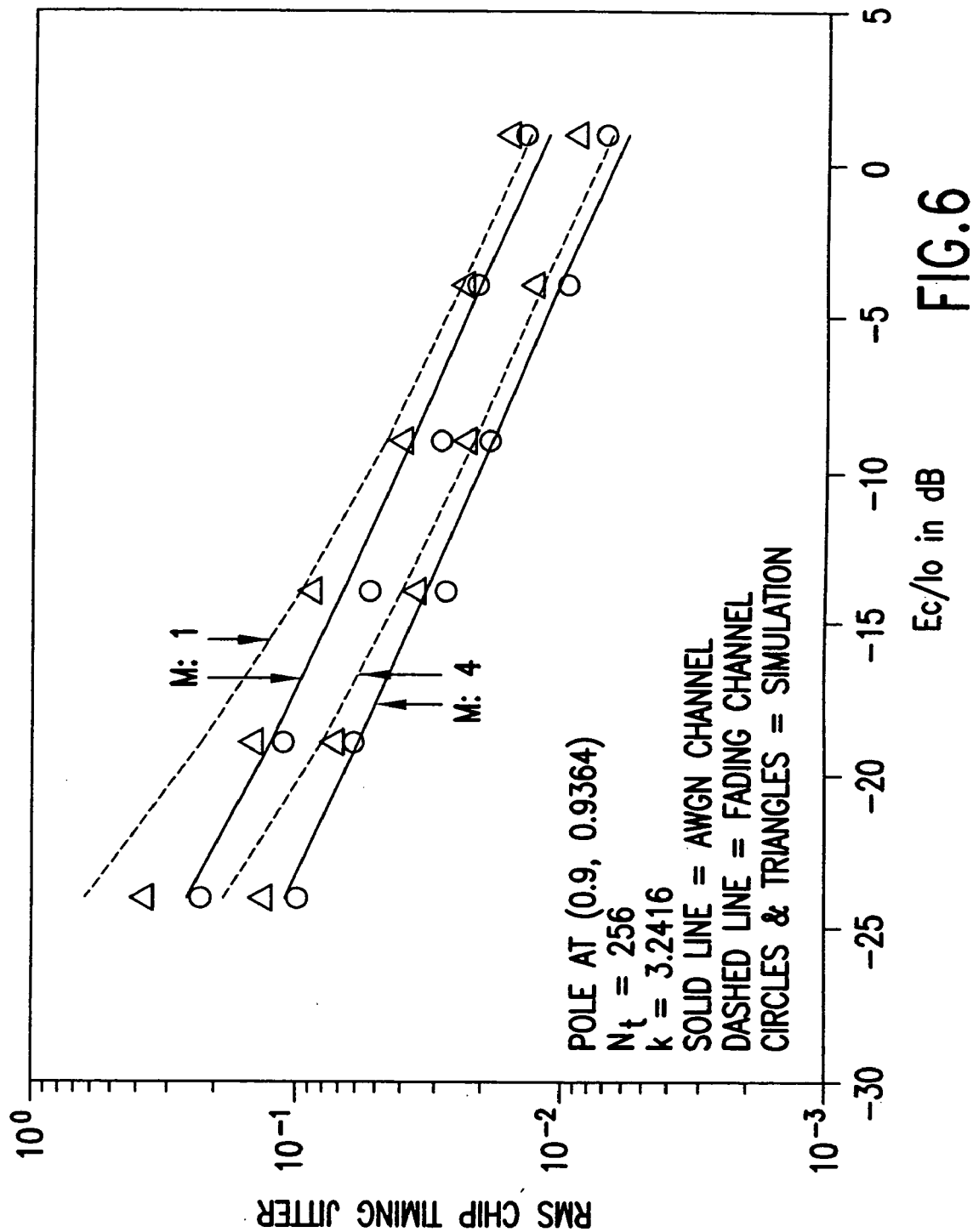
FIG. 6 is a plot a root mean square (RMS) chip time jitter of the second order PN code tracking loop under fading and AWGN environments with the number of antenna elements M as a parameter.

FIGS. 5 and 6 show RMS under AWGN and fading environments for the first and second order PNCTL, respectively, with the number of smart antenna elements M as a parameter. The solid and dashed lines represent analysis results under AWGN and fading environments, respectively. The triangles and circles show corresponding simulation results for AWGN and fading environments, respectively. Results show significant improvement by employing smart antennas, e.g., 6 dB improvement in $E_c/I_0$ with M=4 elements to achieve the same RMS, compared to M=1. Performance under fading environment is slightly degraded, compared to AWGN, especially at low $E_c/I_0$. It is also observed that simulation results agree well with analysis.

Figure 7:
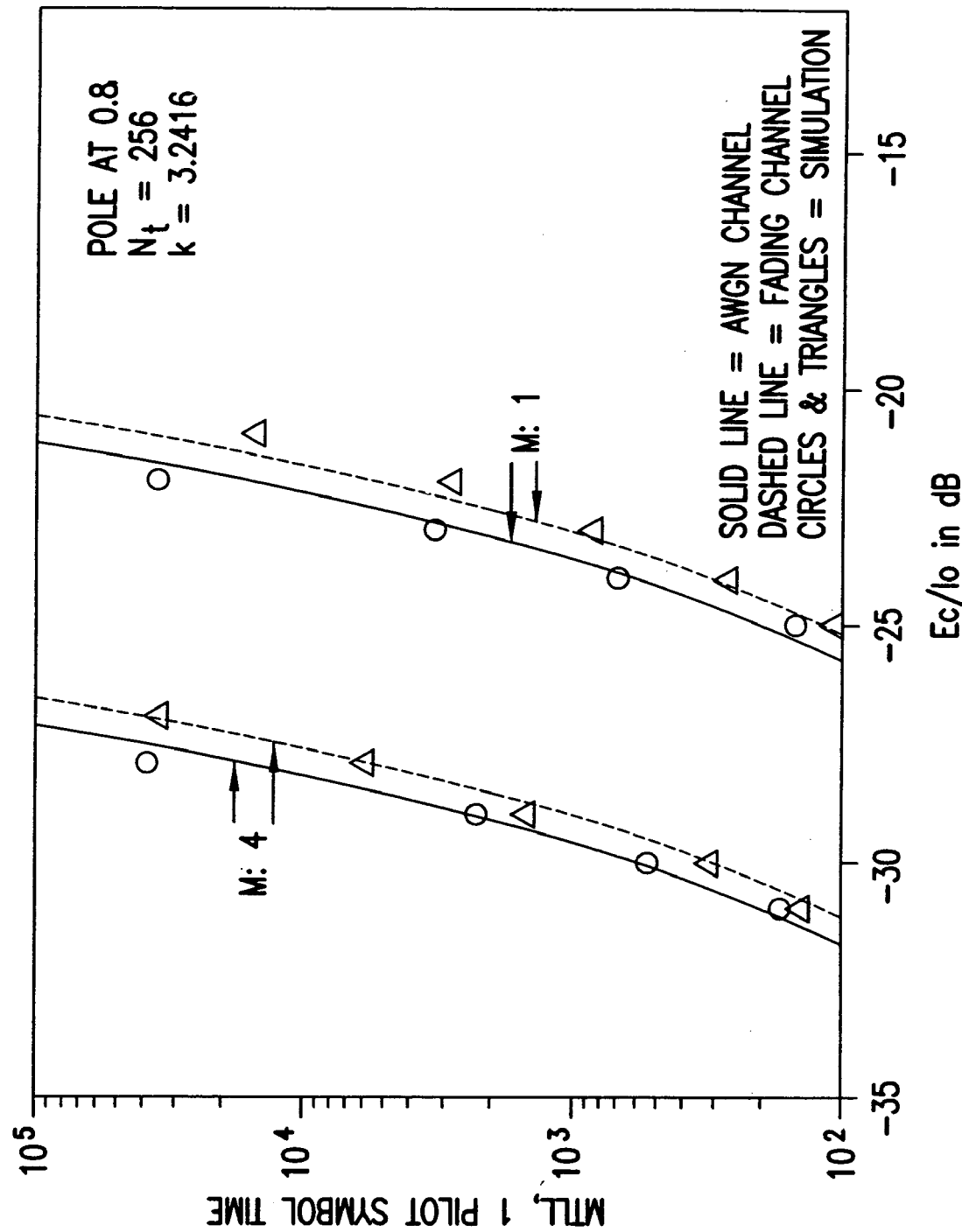
FIG. 7 is a plot of the mean time to lose lock (MTLL) of a first order PN code tracking loop under fading and AWGN environments with the number of antenna elements M as a parameter.
Figure 8:
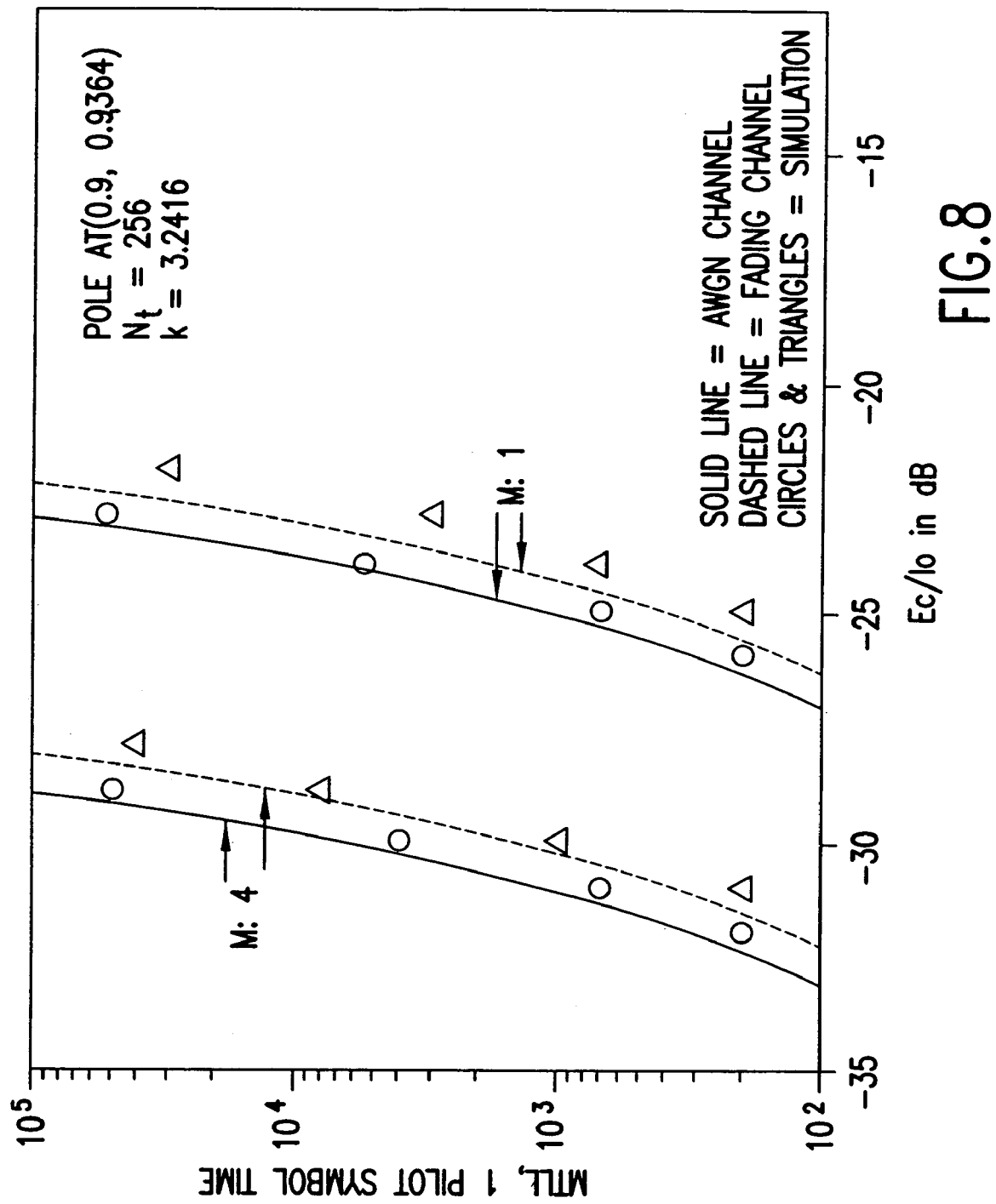
FIG. 8 is a plot of the mean time to lose lock (MTLL) of the second order PN code tracking loop under fading and AWGN environments with the number of antenna elements M as a parameter.

FIGS. 7 and 8 show MTLL under AWGN and fading environments for the first and second order PNCTLs, respectively, with M as a parameter. Again, performance is significantly improved, e.g., by 6 dB with a smart antenna of M=4 elements. Fading channel degrades performance by 0.5 dB, compared to AWGN. The second order PNCTL is about 1 dB better than the first order for the same bandwidth.

5. Conclusions

The invention employs a smart antenna to improve a noncoherent PN code tracking loop. RMS and MTLL were analyzed for the first and second order PNCTLs under fading and AWGN environments. Simulation results agree well with the theoretical results. The proposed PN tracking scheme was simulated with a 3G W-CDMA DPCCH channel. Chip time tracking performance can be improved significantly, e.g., by 6 dB with four antenna elements, compared to a tracking scheme with a single antenna element. For a given bandwidth, the chip time tracking loop with the second order PNCTL can achieve a better MTLL than that achieves with the first order. RMS and MTLL performance under fading environment are slightly worse than that under AWGN. In addition, relations between poles of the PNCTL transfer function with normalized bandwidth and RMS, allow the use of a systematic PNCTL design instead of the tedious trial and error method. Optimum pole locations are 1 on the real axis to minimize RMS for both the first and second order PNCTLs. In conclusion, a smart antenna can significantly improve chip time tracking performance as well as bit error rate.

Obviously, numerous other modifications and variations of the present invention are possible in light of the above teachings. It is therefore to be understood that within the scope of the appended claims, the invention may be practiced otherwise than as specifically described herein.

APPENDIX

Variance of Chip Timing Error in Second Order PN Code Tracking Loop.

$$\mathrm{Var}\left(\frac{\tau}{T_c}\right) = \frac{V_0}{(N_t^2 E_c \kappa)^2} \oint H(z)H(z^{-1}) \frac{dz}{2\pi i z} = \frac{V_0 \gamma^2}{2\pi i} \oint q(z) dz \quad (A1)$$

where $$q(z) = \frac{[z+(-1+a)][1+(-1+a)z]}{[z^2+Az+B][1+Az+Bz^2]} = \frac{[z+(-1+a)][1+(-1+a)z]}{(z-z_1)(z-z_2)(1-z_1 z)(1-z_2 z)} \quad (A2)$$

$$A = -2 + N_t^2 E_c \kappa \gamma \quad (A3)$$

$$B = 1 - N_t^2 E_c \kappa \gamma (1-a). \quad (A4)$$

Let $z_1$ and $z_2$ denote roots of $z^2+Az+B=0$ inside the unit circle. Then $1/z_1$ and $1/z_2$ are roots of $1+Az+Bz^2=0$, which are outside the unit circle. We know $z_1+z_2=-A$ and $z_1 z_2=B$. Then, $$\begin{aligned}\mathrm{Var}\left(\frac{\tau}{T_c}\right) &= \frac{V_0\gamma^2}{2\pi i}\oint q(z)dz \\ &= \frac{V_0\gamma^2}{2\pi i}[2\pi i(\mathrm{Residue}[q(z),z_1] + \mathrm{Residue}[q(z),z_2]+0+0)] \\ &= V_0\gamma^2\left(\frac{[z+(-1+a)][1+(-1+a)z]}{(z-z_2)(1-z_1 z)(1-z_2 z)}\bigg|_{z=z_1} + \frac{[z+(-1+a)][1+(-1+a)z]}{(z-z_1)(1-z_1 z)(1-z_2 z)}\bigg|_{z=z_2}\right) \\ &= \frac{V_0\gamma^2}{1-z_1 z_2}\frac{1+2(z_1+z_2)(-1+a)+(-1+a)^2+z_1 z_2+z_1 z_2(-1+a)^2}{-(z_1+z_2)^2+2 z_1 z_2+z_1^2 z_2^2+1} \\ &= \frac{V_0\gamma^2}{(N_t^2 E_c\kappa\gamma)^2(a-1)}\frac{(2a+2N_t^2 E_c\kappa\gamma-3aN_t^2 E_c\kappa\gamma+a^2 N_t^2 E_c\kappa\gamma)}{(2N_t^2 E_c\kappa\gamma-aN_t^2 E_c\kappa\gamma-4)}.\end{aligned} \quad (A5)$$

The invention claimed is:

1. A method for pseudonoise code tracking, comprising the steps of: receiving a spread spectrum signal in a plurality of elements in a multiple element antenna array; despreading an output from each of the plurality of elements with an early pseudonoise code to form a plurality of early despread outputs; despreading an output from each of the plurality of elements with a late pseudonoise code to form a plurality of late despread outputs; accumulating the early despread outputs and the late despread outputs over a plurality of chip times; comparing an energy of the accumulated early despread outputs with an energy of the accumulated late despread outputs; controlling a chip time shifting amount based on the comparison, wherein the comparing step includes the step of calculating the difference of the square of the accumulated late despread outputs and the square of the accumulated early despread outputs.

2. The method of claim 1, wherein the spread spectrum signal is received on a dedicated physical control channel.

3. The method of claim 1, wherein the early pseudonoise code is advanced by approximately one half of a chip time with respect to an on-time pseudonoise code.

4. The method of claim 1, wherein the late pseudonoise code is delayed by approximately one half of a chip time with respect to an on-time pseudonoise code.

5. The method of claim 1, wherein the plurality of elements comprises all of the elements in the multiple element antenna array.

6. The method of claim 1, wherein each of the plurality of elements is separated from at least one neighboring element by approximately one half of a wavelength c the spread spectrum signal.

7. A method for pseudonoise code tracking, comprising the steps of: receiving a spread spectrum signal in a plurality of elements in a multiple element antenna array; despreading an output from each of the plurality of elements with an early pseudonoise code to form a plurality of early despread outputs; despreading an output from each of the plurality of elements with a late pseudonoise code to form a plurality of late despread outputs; accumulating the early despread outputs and the late despread outputs over a plurality of chip times; comparing an energy of the accumulated early despread outputs with an energy of the accumulated late despread outputs; controlling a chip time shifting amount based on the comparison further comprising the step of weighting the output of each of the plurality of elements.

8. An apparatus, comprising: a processor connectable to a multiple element antenna array, the processor being configured to perform the steps of: receiving a spread spectrum signal in a plurality of elements in a multiple element antenna array; despreading an output from each of the plurality of elements with an early pseudonoise code to form a plurality of early despread outputs; despreading an output from each of the plurality of elements with a late pseudonoise code to form a plurality of late despread outputs; accumulating the early despread outputs and the late despread outputs over a plurality of chip times; comparing an energy of the accumulated early despread outputs with an energy of the accumulated late despread outputs; and controlling a chip time shifting amount based on the comparison, wherein the comparing step includes the step of calculating the difference of the square of the accumulated late despread outputs and the square of the accumulated early despread outputs.

9. The apparatus of claim 8, wherein the spread spectrum signal is received on a dedicated physical control channel.

10. The apparatus of claim 8, wherein the early pseudonoise code is advanced by approximately one half of a chip time with respect to an on-time pseudonoise code.

11. The apparatus of claim 8, wherein the late pseudonoise code is delayed by approximately one half of a chip time with respect to an on-time pseudonoise code.

12. The apparatus of claim 8, further comprising a multiple element antenna array.

13. The apparatus of claim 8, wherein each of the plurality of elements is separated from at least one neighboring element by approximately one half of a wavelength of the spread spectrum signal.

14. The apparatus of claim 8, further comprising a voltage controlled oscillator connected to the processor, wherein the chip time shifting amount is controlled by varying an input to the voltage controlled oscillator.

15. An apparatus, comprising: a processor connectable to a multiple element antenna array, the processor being configured to perform the steps of: receiving a spread spectrum signal in a plurality of elements in a multiple element antenna array; despreading an output from each of the plurality of elements with an early pseudonoise code to form a plurality of early despread outputs; despreading an output from each of the plurality of elements with a late pseudonoise code to form a plurality of late despread outputs; accumulating the early despread outputs and the late despread outputs over a plurality of chip times; comparing an energy of the accumulated early despread outputs with an energy of the accumulated late despread outputs; and controlling a chip time shifting amount based on the comparison, further comprising the step of weighting the output of each of the plurality of elements.

* * * * *